No. 713,073. Patented Nov. 11, 1902.
H. DENIS.
ROTARY STEAM ENGINE.
(Application filed July 5, 1902.)
(No Model.) 6 Sheets—Sheet 5.

Witnesses: Hormisdas Denis, Inventor,
By Marion & Marion
Attorneys

No. 713,073. Patented Nov. 11, 1902.
H. DENIS.
ROTARY STEAM ENGINE.
(Application filed July 5, 1902.)
(No Model.) 6 Sheets—Sheet 6.

Witnesses: Hormisdas Denis Inventor,
By Marion & Marion
Attorneys

UNITED STATES PATENT OFFICE.

HORMISDAS DENIS, OF VILLE ST. LOUIS, CANADA.

ROTARY STEAM-ENGINE.

SPECIFICATION forming part of Letters Patent No. 713,073, dated November 11, 1902.

Application filed July 5, 1902. Serial No. 114,514. (No model.)

*To all whom it may concern:*

Be it known that I, HORMISDAS DENIS, a subject of the King of Great Britain, residing at Ville St. Louis, county of Hochelaga, Province of Quebec, Canada, have invented certain new and useful Improvements in Rotary Steam-Engines; and I do hereby declare that the following is a full, clear, and exact description of the invention, such as will enable others skilled in the art to which it appertains to make and use the same.

My invention relates to a rotary steam-engine of that type in which a rotary piston revolves eccentrically in an external cylinder.

The object of my present invention is to provide a rotary engine of much increased efficiency over those hitherto constructed and one which shall be of very great capacity condensed into a very small space, and, further, to avoid the noise and loss from friction, which have been hitherto the general, if not universal, concomitant of this type of motor.

To these and other ends, as will hereinafter be seen, my invention consists, substantially, in an external cylinder having a shaft revolving concentrically therein, which shaft carries keyed thereon a compound rotary piston made up of one or preferably a plurality of eccentric circular pistons smaller than the internal diameter of the cylinder and mounted to rotate in contact therewith. Between each section of this compound rotary piston is a circular transverse partition filling the entire cylinder and separating the different sections into corresponding independent steam expansion-spaces, and coöperating with each of the said sections of the rotary piston is an independent oscillating abutment, which has a packing-segment arranged to oscillate thereon in contact with the piston, whereby to constantly prevent the steam from passing the said abutment. The crescent-shaped steam-space around the section of the rotary piston is when the most outward portion of the piston-section is passing the abutment open at both ends, and to one end is connected the steam-port, in which is placed an oscillating admission-valve, which is operated by an eccentric on the main shaft of the engine, and the opposite end of the said crescent-shaped steam-space is open directly to the exhaust of the engine. In this manner and by the coaction of the parts, which shall be hereinafter more explicitly specified, the steam, being admitted at the proper time, just after the point of contact of the piston-segment has passed said oscillating abutment, is admitted through the widening steam-space between the piston-section and said abutment, and said piston is thereby caused to rotate until finally by its continued rotation the space containing the steam is opened to the exhaust, at or before which time the admission-valve is caused by the eccentric above mentioned to be closed, so as to exclude the admission of steam and where desired to cause any desirable expansion of the steam in the cylinder to take place.

My invention further consists in causing the positive oscillation of the abutment by means of an independent rock-shaft on which said abutment is mounted and to which it is keyed, said rock-shaft being arranged to be operated by an eccentric which is connected to a rock-arm thereof and is operated from the main shaft of the engine.

My invention further consists in the construction and combination of parts, which will be hereinafter described, and more specifically set forth in the claims.

In the drawings accompanying this specification I have shown one form of my invention, this being adapted to an engine of small size—as at present built about ten or twelve horsepower—and of course it will be understood that the engine may assume various other forms, according to the size and the purpose for which it is intended.

In the drawings.

The same numerals of reference denote like parts in all the figures of the drawings.

The engine consists in the main of a casting 15, comprising a concentrically-bored cylinder 16, supported on a pedestal 17, having a base-plate 18 and a rotary piston 19 solidly keyed upon the main shaft 20 of the engine, which is arranged to rotate coaxially with the cylinder 16 and is mounted centrally in the heads thereof, 21 and 22. The piston 19 is of the same external length as that of the chamber of the cylinder 16, so as to completely fill the space between the two heads thereof, and it may be keyed to the shaft by means of a longitudinal key 23 at each end; but this key will not be necessary in many cases, as I prefer to cast the piston around the shaft, so as to make the two substantially one piece. In order to support the shaft and the piston carried thereby, so as to permit the same to rotate with the least possible friction, while at the same time preventing the escape of steam, I provide each end of the shaft, just beyond the end of the piston, with a screw-thread 24, over which is adapted to be placed a nut 25, having in it an annular raceway for a series of balls or antifriction-rollers 26, and with this nut coacts another nut 27, which is provided with an external thread and screwed into the boss 28 on the cylinder-head, this nut 27 being likewise provided with a coöperating raceway to complete the channel in which the balls 26 run. Externally of the nut 27 there is provided a packing-gland 29, within which may be inserted any suitable packing material 30, which surrounds the shaft 20 and prevents the escape of steam therethrough.

The cylindrical chamber 16 is plain internally; but the rotary piston 19 is divided into three longitudinal sections, as herein shown, although it will be understood that only one section may be employed, if desirable—as, for instance, in small engines—whereas the number may be multiplied indefinitely. The center section is designated 30, and in this form of the engine is twice the length of the two end sections 31, and the three sections are separated from each other and from the cylinder-heads by a series of four partitions 32, which are concentric with the shaft 20 and with the cylinder and are of the same size as the cylinder is internally, and these partitions 32 are provided around their edges with grooves 33, in which is placed suitable packing material, so as to shut off the several steam-spaces 34 and 35 from each other. The three sections 30 and 31 of the cylinder are not formed concentric with the shaft, but eccentric, being of smaller internal diameter than the cylinder and arranged to be tangent at one point of their circumference with the cylinder, and at this point they are provided with longitudinal grooves 37 and 38, which are adapted to receive packing material 39ᵃ, thus preventing the steam from escaping along the line of tangency. The central section 30 of the piston has its center at one hundred and eighty degrees from—that is to say, diametrically opposite to—that of the two end sections 31, so that the action of the steam on the several sections will balance each other at all times by causing an equal couple about the center of the shaft; but of course other arrangements might be adopted—as, for instance, the three sections might be of equal length and placed at one hundred and twenty degrees from each other.

Figures 6, 7, 8, 9, 10, 11, 15:
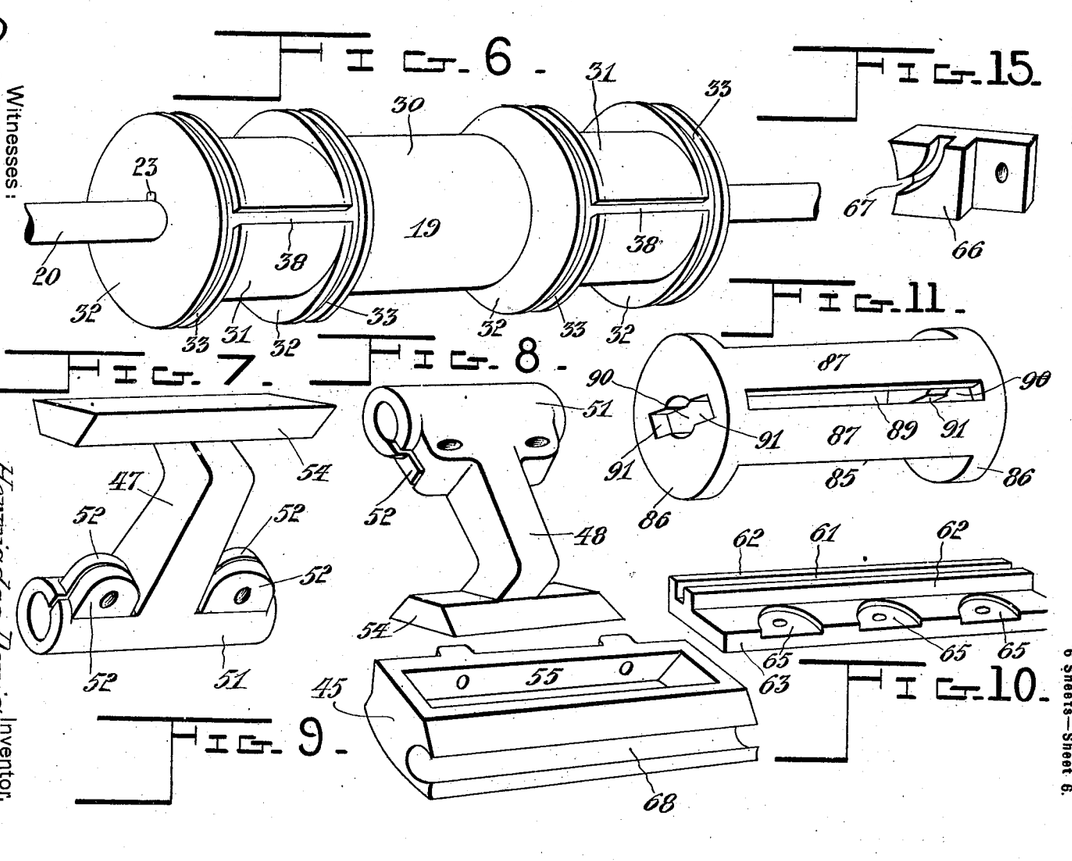
Fig. 6 is a perspective view of the rotary piston.
Fig. 7 is a similar view of the center abutment-arm.
Fig. 8 is a similar view of one of the end abutment-arms.
Fig. 9 is a similar view of the center abutment from the lower side.
Fig. 10 is a similar view of the packing-plate for the center abutment.
Fig. 11 is a similar view showing the admission-valve for the center section.
Fig. 15 is a detail of one of the parts.

The casting 15 is formed with certain ports and passage-ways around the cylinder 16 and which communicate therewith, as will now be described. There is at one side formed a chamber 39, which is opposite to the central section of the piston and communicates with the steam-space thereof at a point opposite the center of the shaft 20, and this chamber is open at its opposite side and may be closed by a suitable cover 40, secured thereon by bolts or studs 41. Similarly the two ends of the cylinder are each provided with a similar chamber 42, which are diametrically opposite to the chamber 40 and communicate with the end steam-spaces of the piston at the opposite side of the shaft, these chambers being closed externally by cover-plates 43, screwed on by bolts or studs 44 to the casting 15. Each of these chambers 39 and 42 is of sufficient size to permit of the oscillation therein of an abutment 45 and 46, which is a block having the same length as the length of the steam-space and of the chamber in which it is mounted and is fixed on one of the abutment-arms 47 48, which are keyed to the rock-shafts 49 and 50, respectively, arranged to oscillate in the casing of the engine. The central abutment-arm 47 and the abutment 45 are illustrated in Figs. 7 and 9, respectively, and the former has, as shown, a split hub 51, having ears 52, through which bolts 53 are adapted to pass to tighten and clamp the abutment-arm on the rock-shaft, and at its upper end the arm 47 has formed a T-shaped lug 54, which is beveled inwardly on its edges and which is adapted to be received by the dovetailed recess 55, formed on the under surface of the abutment-block 45. This dovetailed recess is wider than the lug 54, so that after the lug has been socketed therein it is tightened up in place by means of a shim 56 and set-screws 57, provided with jam-nuts 58, and thus a secure fastening for the abutments is provided. The upper surface 59 of these abutment-blocks is of curved cylindrical form, arranged to be concentric with the rock-shaft 49, and with this abutment coöperates a packing-strip 60, which lies in a groove 61, formed between the two upstanding flanges 62 of the packing-plate 63, which is secured to the upper side of the chamber 39 by means of screw-bolts 64, seated in recesses 65 on the face of the packing-plate. By this arrangement it will be seen that the packing-strip 60 forms always a tight connection for the abutment, so as to prevent any steam from passing over the top thereof, and I have arranged, further, to coöperate with the abutment at each end a packing-block 66, which has an arcuate groove 67 therein, in which is placed packing material, which presses against the end of the abutment-block, and thus shuts off the escape of steam from around the ends of said block. The abutment-block has, moreover, on its forward edge—that is to say, on its edge adjacent to the cylinder—a cylindrical groove 68, which is open at the side sufficiently to contain the oscillating packing-piece 69 and to permit the same to oscillate therein, and to hold the packing-segment 70, which it does by means of a radially-projecting rib 71, formed on the packing-segment to project into the radial groove 72 of the packing-piece 69. The packing-segment 70 is planed to the same radius as the section of the piston 19, so that in the rotation of the piston the segment 70 is adapted to be always in full and firm contact with the piston, and while offering ample bearing-surface prevents any possible escape of steam through the abutment, it being understood, of course, that as the piston rotates the abutment-block 45 and the arm 47, carrying it, will oscillate back and forward and that the packing-piece 69 and segment 70 will have an independent oscillation on the abutment-block. Now this might be done by means of a spring, which would keep the abutment-block in constant resilient contact with the piston, and as is usual in rotary engines; but the great advantage of my construction is that I am not dependent on a spring to actuate the abutment, because the movement is such that the necessary motion of the rock-arm 47 coincides precisely with that which is given to an external rock-arm 73 by an eccentric-disk 74, keyed on the end of the shaft. The eccentric-disk 74 is provided with a suitable strap 75, which has a lug 76 at one side to which the arm 73 is pivoted by means of a bolt 77, and the arm 73, as shown, is clamped to the rock-shaft 49 by means of a split hub 78, ears 79, and a bolt 80. I further preferably arrange to support the abutment-block 45 against the reaction of the steam, and to prevent its whole pressure coming transversely upon the rock-shaft by means of a trough-shaped bearing-piece 81, which may be fused and poured into the cup-shaped space 82, formed at the bottom of the chamber 39, around the shaft 49.

Figure 1:
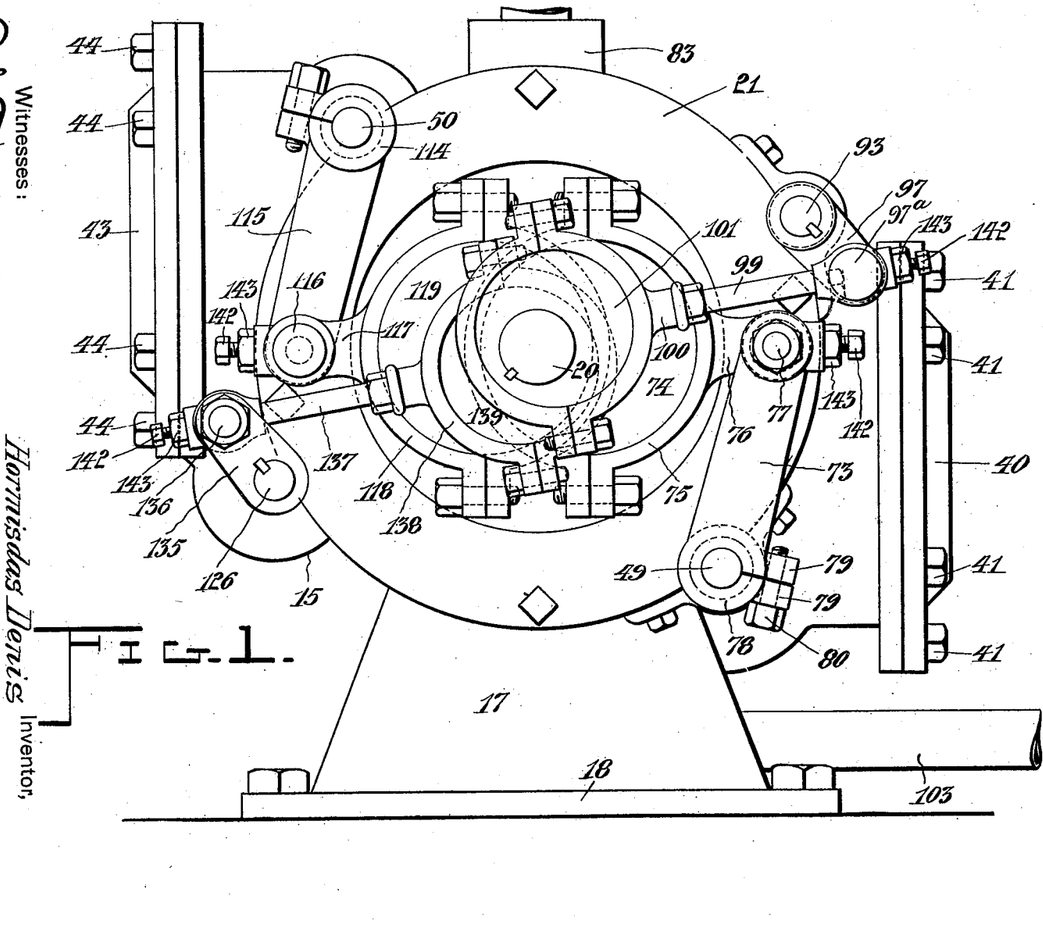
Figure 1 is an end view of the engine from the eccentric end, the outboard bearing being removed and the shaft being shown in section.
Figure 2:
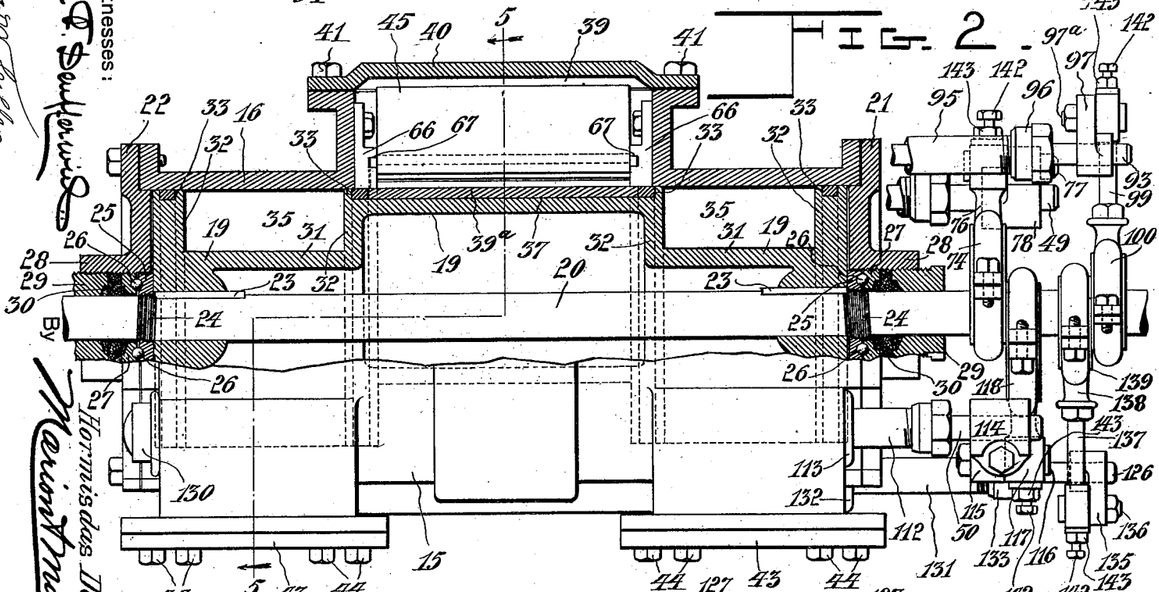
Fig. 2 is partly a plan view and partly an axial plan section of the engine.
Figures 3, 12:
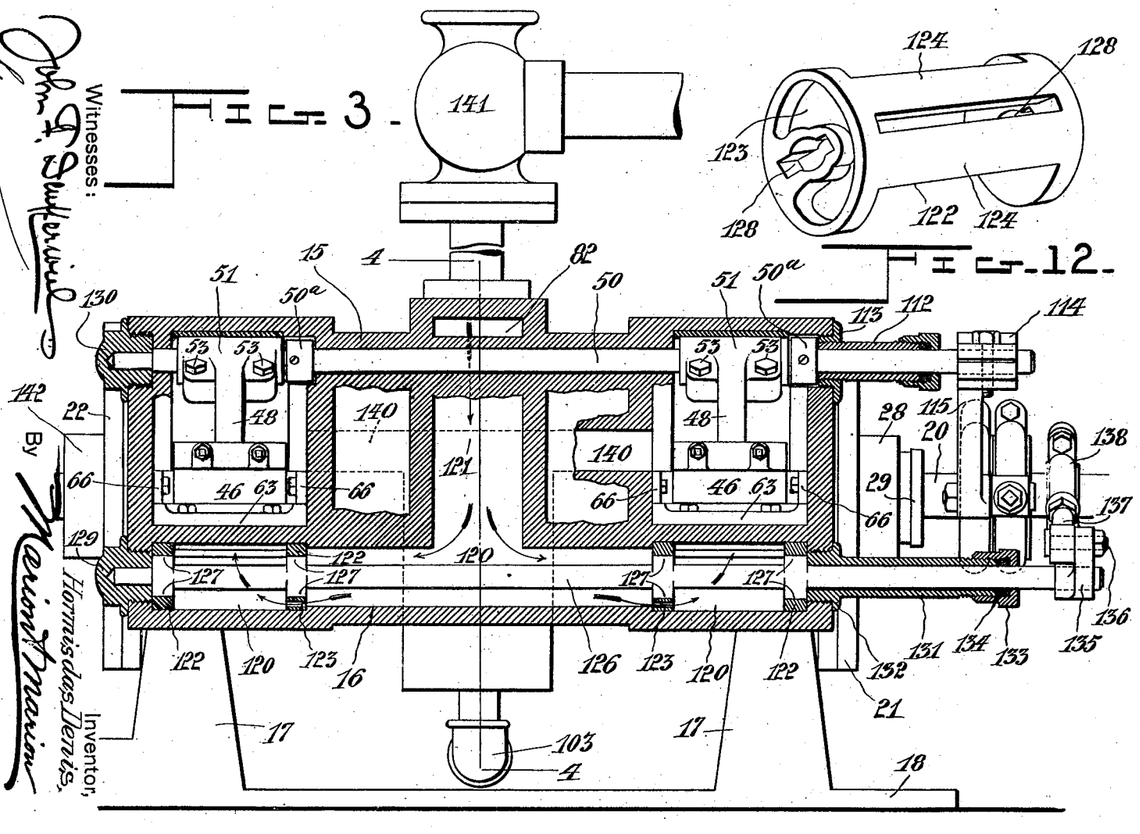
Fig. 3 is a vertical section through the casing of the engine, taken on the line 3 3 of Fig. 4.
Fig. 12 is a similar view of one of the end admission-valves.
Figure 13:
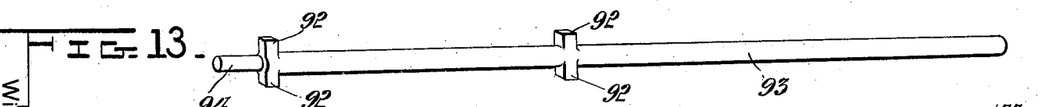
Fig. 13 is a similar view of the valve-rod for the center section.
Figure 14:
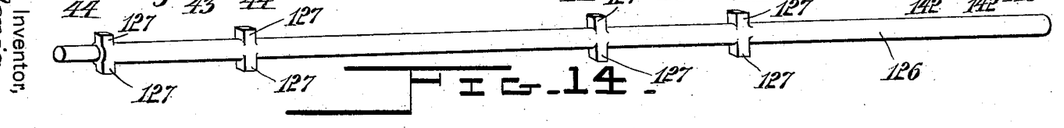
Fig. 14 is a similar view of the valve-rod for the two end sections of the piston.

It will be seen from the above arrangement of the packing material 60 and the abutment-block that the chamber 39 is thereby divided into two independent spaces, one of which is adapted to be occupied by the live steam and the other of which is connected to the exhaust-passage. The steam-inlet is designated by the numeral 82, being at the top of the casting 15 and provided with a suitable boss 83 for the attachment of a steam-pipe. From this inlet leads a port $83^a$ around the circumference of the cylinder 16 to a valve-chest 84, in which is oscillably mounted a valve 85. This valve is of the form shown in detail in Fig. 11, having a pair of cylindrical heads 86, adapted to completely fill the valve-chamber and which are connected by segmental laps 87, adapted to lie flat against the lower surface of the valve-chamber at the side where it is connected with the cylinder 16 by the steam-port 88. Between the two laps 87 is formed an admission-port 89 of the proper size, designed on regular well-known principles to admit steam to the cylinder 16 and cut it off therefrom at the proper times to secure the desired ratio of expansion. The two heads 86 of the valve are each provided with a central bore 90 and key-slots 91, into which are adapted to fit the key-lugs 92, formed on the valve-rod 93. (Shown in detail in Fig. 13.) The inner end of this valve-rod is reduced, as shown at 94, being adapted to oscillate in a suitable step formed in the casting 15, and the opposite end is carried through the casing of the engine and through a long supporting-tube 95, which is screwed into the end of the valve-chest and carries at its other end a stuffing-box 96, and the free end of the shaft 93 extending through this stuffing-box has keyed thereon a short rock-arm 97, to which is pivotally connected by a pivot-pin $97^a$ the rod 99 and an eccentric-strap 100, which is mounted on the eccentric 101, keyed to the shaft 20. The rotation of the shaft 20 is thus caused to oscillate the valve 85, so as to admit and cut off steam at the proper time. The lower end of the chamber 39, which is separated from the steam-port 88 and the upper part of the chamber in the manner above described, is connected to the exhaust by a port 102, from which leads the pipe 103 to the open air or a suitable condenser. In like manner I have constructed the two end sections of the engine. In the chambers 42, as above stated, are mounted the abutment-blocks 46 on the rock-arms 48, keyed to the single rock-shaft 50. The abutment-blocks 46 are provided with cylindrical surfaces 104, against which press the packing-strips 105, mounted in the packing-plates 106, secured to the side of the chambers 42 by bolts 107, and the ends of the abutment-blocks are likewise rendered steam-tight by packing 108, mounted in the blocks 109, and said abutment-blocks have oscillating packing-pieces 110 and segments 111 concentric with the sections 31 of the piston, all in the same manner as described for the middle section. The shaft 50 is of the form shown more particularly in Fig. 3, being provided with thrust-collars 50ª and having a long tubular bearing 112, which is screwed into the end of the casing 15 to close the valve-chest by an annular plug 113, and on the end of the shaft 50 is clamped a split hub 114 of the rock-arm 115, whose free end is connected by a pin 116 to the ear 117 of the eccentric-strap 118, within which turns the eccentric 119, keyed to the shaft 20, so that the same motion is given to the end abutments as to the center abutment. It will be observed that the position of the abutment-arms 48 is reversed with respect to the arm 47, so that it is necessary to provide the valve-chests 120 for the end sections below the abutments, and to this end there is formed in the casting 15 a long steam port or channel 121, leading from the inlet 82 around the cylinder 16 in the center thereof on the opposite side from the port 83ª and entering at the ends of the two steam-valves 122, which are therefore differently formed from the steam-valve 85, as shown in Fig. 12, being provided with one end open to permit the passage of steam through the center, as shown at 123. The valves 122 are provided with laps 124, coöperating with the steam-port 125 in the same manner as in the case of the center section, and they are keyed to the valve-rod 126 by the key-lugs 127 thereof, seated in the key-slots 128, formed in the end flanges of the valves. The valve-rod 126 is pivoted at its inner end in a step bearing-block 129, which is screwed into the end of the valve-chest, as shown, and the shaft 50 is provided with a similar bearing-block 130. The other end of the shaft 126 is supported in the tubular bearing 131, having a hub 132 screwed into the opposite end of the valve-chest 120, and over the end of this piece 131 is screwed a gland 133 to form a stuffing-box 134. On the outer end of the valve-rod is fixed a rock-arm 135, to which is pivoted, by a pin 136, the eccentric-rod 137, mounted on the strap 138, which is mounted on the eccentric-sheave 139, keyed to the shaft 20. The several pivot-pins 77, 79ª, 116, and 136 are shown as fixed in place by set-screws 142, with which coact jam-nuts 143, mounted on the respective eccentric rods and lugs.

Figure 4:
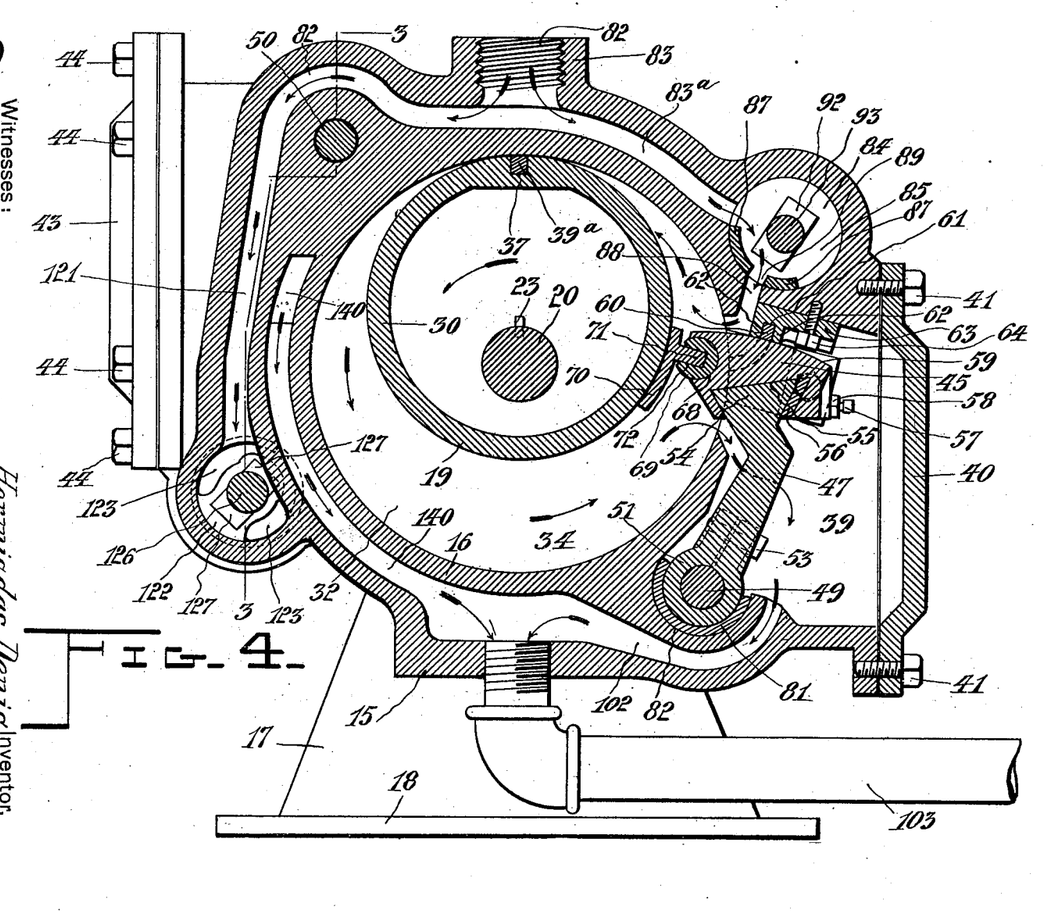
Fig. 4 is a transverse vertical section through the engine, taken through the center of the cylinder—that is to say, on the line 4 4 of Fig. 3.
Figure 5:
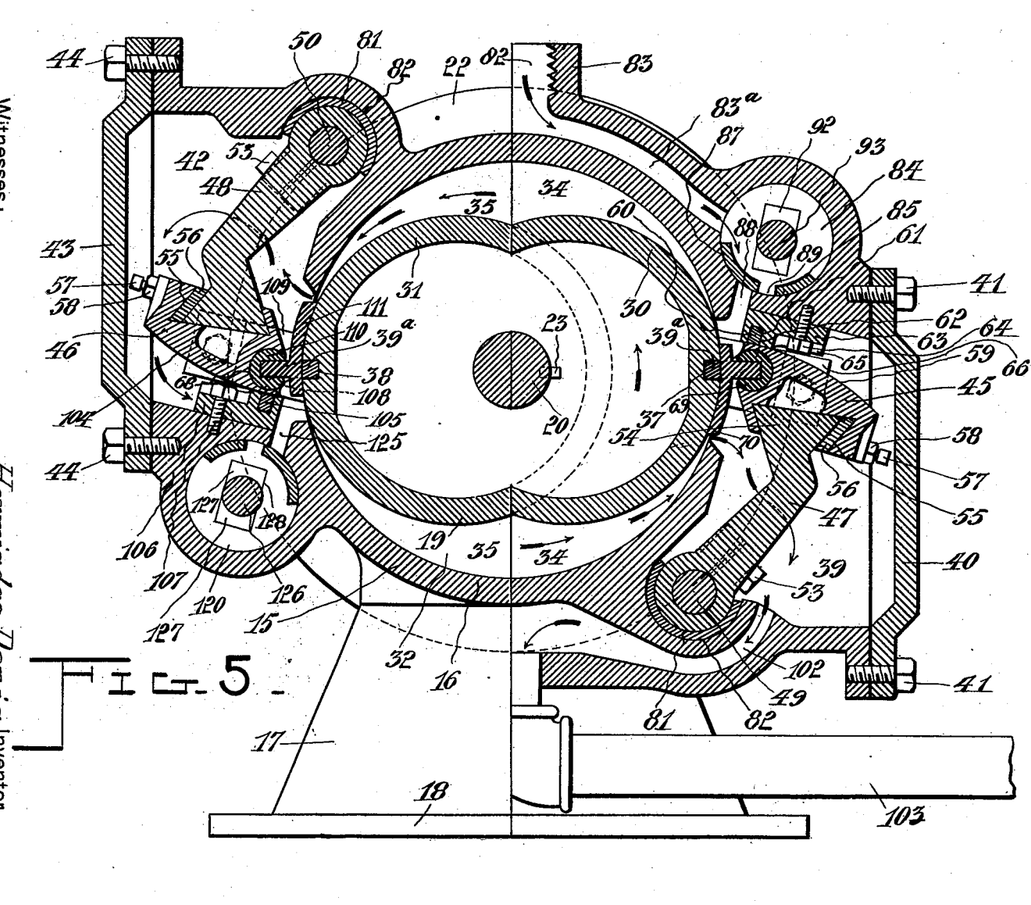
Fig. 5 is a transverse section taken on the broken line 5 5 of Fig. 2.

The arrangement of the inlet and exhaust ports of the end sections is most clearly illustrated in Figs. 3 and 4, and it will be seen that the exhaust-port 140, which overlaps the admission-port 121, is branched and leads down centrally to the exhaust-pipe 103 within the steam-port 121.

Where necessary I may provide the engine with a suitable throttle-governor 141, located in the admission-pipe and which may be connected to the shaft of the engine in any suitable manner.

The operation of the engine is as follows with respect to the center section of the piston: When the latter is in the position shown in Fig. 4, the steam will be admitted to the space between the walls of the cylinder, the abutment, and the piston, and by reason of the eccentricity of the latter it will be driven around in the direction of the arrow. The packing 60 prevents the steam from reaching the exhaust portion of the chamber 39, and when the piston has reached a certain point in its revolution the eccentric operating the valve-rod is caused to oscillate the valve 85, so as to cut off the steam, and thereafter the rotation of the piston will take place by expansion of the steam within the cylinder until the tangential point of the piston carrying the packing 39ª reaches the abutment, whereupon the steam-space will be opened to the exhaust portion of the chamber 39 and the steam will escape therefrom. During this time the valve 85 is caused to remain closed; but as the cylinder continues to revolve it is opened again as soon as the tangential point of the piston-section passes the admission-port 88. The same action takes place with the end sections of the piston, the steam being admitted, cut off, and exhausted contemporaneously in all three sections, whereby the couple acting on the shaft 20 is uniform and central at all times. As a means of obtaining power from the shaft 20 a power-pulley 142 may be keyed thereon.

The engine above described avoids most of the defects common to rotary engines, especially that of excessive friction and noise, and by further providing for an expansive working of the steam produces a great increase in the efficiency which could hitherto be had with a small-sized engine.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. A rotary engine comprising a hollow cylinder mounted on a stationary base and having a steam-port and an exhaust-chamber formed on one side thereof and communicating with the interior of the cylinder, a cylindrical rotary piston mounted to revolve eccentrically within said cylinder in constant contact with the interior wall thereof, an abutment arranged to oscillate in constant contact with said piston and to separate said steam-port and exhaust-chamber from each other, a pivotally-mounted abutment-arm to the free end of which said abutment is secured, a cylindrical packing-piece oscillably mounted on said abutment and a packing-segment coradial with said piston and slidably mounted on said packing-piece in contact with said piston.

2. A rotary engine comprising a hollow cylinder mounted on a stationary base and having a steam-port and an exhaust-chamber formed on one side thereof and communicating with the interior of the cylinder, a cylindrical rotary piston mounted to revolve eccentrically within said cylinder in constant contact with the interior wall thereof, an abutment arranged to oscillate in constant contact with said piston and to separate said steam-port and exhaust-chamber from each other, a rock-shaft, an abutment-arm keyed thereto and carrying the abutment mounted on its free end, means for oscillating said rock-shaft synchronously with the rotation of the piston, whereby to keep said abutment at all times in contact therewith, and a packing-segment oscillably mounted on said abutment and adapted to rest against said piston and coradial with the latter, said segment having also a sliding movement in its mounting toward and from the center of the piston, whereby it is adapted to maintain close contact with the surface of the piston and maintain a tight joint independently of irregularities in the motion of the abutment.

3. In a rotary engine, the combination of a cylindrical eccentric rotary piston, an oscillating abutment, a cylindrical packing-piece having a radial slot and mounted to oscillate in a cylindrical recess in said abutment, and a packing-segment coradial with said piston and having a rib adapted to fit in said radial slot, whereby to permit said segment to lie at all times flat upon said piston.

4. In a rotary engine, the combination of a cylindrical rotary piston mounted to turn on an eccentric axis, a rock-shaft, a rock-arm keyed to said rock-shaft, an abutment clamped to said rock-arm, and a packing-segment comprising a broad plate coradial with said piston and adapted to lie in contact therewith and oscillably mounted on said abutment, in combination with a rock-arm keyed to said rock-shaft, an eccentric sheave mounted on the shaft of said piston, and a strap rotatably mounted on said eccentric sheave and connected with said rock-arm, whereby to give said abutment a positive oscillation synchronous with the motion of said piston, said segment having also a sliding movement in its mounting toward and from the center of the piston, whereby it is adapted to maintain close contact with the surface of the piston and maintain a tight joint independently of irregularities in the motion of the abutment.

5. A rotary engine comprising a stationary cylinder, a main shaft mounted to rotate coaxially therewith, a cylindrical eccentric rotary piston mounted on said shaft tangentially of the wall of said cylinder, a pair of partitions at the ends of said piston and cylinder adapted to inclose the piston to form a steam-space, said partitions being mounted to rotate with said piston and concentric with the cylinder, an exhaust-chamber connected with said cylinder at one side thereof, an abutment adapted to oscillate in said exhaust-chamber, a steam-port entering the cylinder at one side of said exhaust-chamber, packing material arranged around the sides of said abutment to separate the steam-port hermetically from said exhaust-chamber, a pivoted abutment-arm on which said abutment is mounted within said exhaust-chamber, an eccentric mounted on said main shaft, and a connection between said eccentric and said abutment-arm to oscillate the same synchronously with the motion of the piston.

6. A rotary engine comprising a stationary cylinder, a main shaft mounted to rotate coaxially therewith, a cylindrical eccentric rotary piston mounted on said shaft tangentially of the wall of said cylinder, a pair of partitions at the ends of said piston and cylinder adapted to inclose the piston to form a steam-space, said partitions being mounted to rotate with said piston and concentric with the cylinder, an exhaust-chamber connected with said cylinder at one side thereof, an abutment adapted to oscillate in said exhaust-chamber, a steam-port entering the cylinder at one side of said exhaust-chamber, packing material arranged around the sides of said abutment to separate the steam-port hermetically from said exhaust-chamber, a pivoted abutment-arm on which said abutment is mounted within said exhaust-chamber, an eccentric mounted on said main shaft, a connection between said eccentric and said abutment-arm to ocillate the same synchronously with the motion of the piston, a valve-chest at the head of the steam-port, a cylindrical valve adapted to oscillate therein, a valve-rod coaxial with said valve and adapted to oscillate the same, a second eccentric mounted on the engine-shaft, and a connection between said eccentric and said valve-rod to oscillate the same to admit and cut off steam at the proper times relative to the rotation of the piston.

7. In a rotary engine, an oscillating abutment comprising a rocking abutment-arm having an enlarged end of triangular section, an abutment-block having a dovetailed recess into which said enlarged end is adapted to fit, a shim or key adapted to slide between said enlarged end and the side of said dovetailed recess, and means for holding said shim or key in place.

8. In a rotary engine, an oscillating abutment comprising a rocking abutment-arm having an enlarged end of triangular section, an abutment-block having a dovetailed recess into which said enlarged end is adapted to fit, a shim or key adapted to slide between said enlarged end and the side of said dovetailed recess, means for holding said shim or key in place, a cylindrical packing-piece oscillably mounted in a cylindrical recess in the forward side of said abutment, and having a radial slot therein, and a curved packing-segment having a rib fitting in said radial slot.

9. In a rotary engine, the combination of a pivoted abutment-arm, an abutment-block mounted on the end of said arm and having an outer surface concentric with the pivot thereof, an independent packing-plate bolted to the engine-casing opposite said concentric surface and projecting into contact therewith, beyond the wall of the casing and packing material recessed to said plate in contact with said concentric surface.

10. A rotary engine comprising a hollow stationary cylinder, a main shaft mounted to turn coaxially therein, a rotary piston comprising a plurality of eccentric cylindrical sections each adapted to have tangential contact with some point of the cylinder, said sections being disposed on alternately opposite sides of the main shaft, a series of partitions of the same diameter as the cylinder and concentric therewith between and at the ends of the sections of said pistons, whereby to inclose the steam-space between each section and the cylinder, a series of reciprocating abutments in constant contact with the respective sections of the piston, and on alternately opposite sides of the main shaft corresponding to the disposition of said piston-sections, a steam-port at one side of each abutment, an exhaust-port at the opposite side, and two independent valves for admitting and cutting off steam at the proper times to each steam-port during the rotation of the piston, each valve being arranged to serve one of the two sets of alternate piston-sections.

11. In a rotary engine, a hollow stationary cylinder, a pair of cylinder-heads closing the ends thereof and having central tubular internally-threaded bosses, a main shaft mounted concentrically in said cylinder, a rotary piston mounted on said shaft, a bearing-nut mounted on the shaft at each end of the piston, a coöperating bearing-nut mounted in the threaded boss of each cylinder-head, and a packing-gland threaded into said boss outside of said nut and adapted to confine packing material inserted within the same.

12. A rotary engine comprising a hollow stationary cylinder, a main shaft mounted to turn coaxially therein, a rotary piston comprising three eccentric cylindrical sections, the two end sections being disposed on the opposite side of the main shaft from the middle section, partitions hermetically dividing the several sections, a series of reciprocating abutments in constant contact with the respective sections of the piston, the end abutment being on opposite sides of the cylinder from the middle abutment, a steam-port at one side of each abutment, an exhaust-port at the opposite side, a valve in each steam-port, a pair of longitudinal valve-rods on which the middle and end valves are respectively mounted, said valves being on opposite sides of the cylinder, and means operated by the main shaft for oscillating both valve-rods to admit steam to the middle and end sections of the piston alternately.

13. A rotary engine comprising a hollow stationary cylinder, a shaft mounted to rotate coaxially therein, a rotary piston mounted on said shaft and comprising three eccentric cylindrical sections, the eccentricity of the central section being diametrically opposite that of the two end sections and its length being double that of each of the latter, three exhaust-chambers for the respective sections of the piston located on respectively opposite sides of the same, a pair of rock-shafts parallel with the axis of the piston, an abutment-arm keyed to one of said rock-shafts and adapted to oscillate in the exhaust-chamber of the central section, an abutment-block clamped to the end of said rock-arm and arranged to be in constant contact with the central section of the piston, packing material disposed around the sides of said abutment-block to hermetically close said exhaust-chamber, a pair of similar abutment-arms keyed to the other said rock-shaft and oscillating in the exhaust-chambers of the respective end sections of the piston, a pair of abutment-blocks similarly mounted on said last-mentioned abutment-arms, packing material similarly located with respect to said last-mentioned abutment-blocks, three steam-admission ports communicating with the respective sections of the cylinder on the forward side of the respective abutments, three cylindrical valve-chests located in the respective steam-ports, three cylindrical valves mounted in the respective valve-chests, a valve-rod coaxial with the valve of said central piston-section and adapted to oscillate the same, a second valve-rod coaxial with the other two valves and adapted to oscillate the same, a pair of rock-arms mounted on the respective rock-shafts, a pair of eccentrics mounted on the main shaft of the engine and connected with the respective rock-arms whereby to give said abutments a motion corresponding to the motion of the respective piston-sections, a second pair of rock-arms mounted on the respective valve-rods, and a second pair of eccentrics connected with said last-mentioned rock-arms to oscillate said valves, substantially as described.

14. A rotary engine comprising a hollow stationary cylinder, a shaft mounted to rotate coaxially therein, a rotary piston mounted on said shaft and comprising three eccentric cylindrical sections, the eccentricity of the central section being diametrically opposite that of the two end sections and its length being double that of each of the latter, three exhaust-chambers for the respective sections of the piston located on respectively opposite sides of the same, a pair of rock-shafts parallel with the axis of the piston, an abutment-arm keyed to one of said rock-shafts and adapted to oscillate in the exhaust-chamber of the central section, an abutment-block clamped to the end of said rock-arm and arranged to be in constant contact with the central section of the piston, packing material disposed around the sides of said abutment-block to hermetically close said exhaust-chamber, a pair of similar abutment-arms keyed to the other said rock-shaft and oscillating in the exhaust-chambers of the respective end sections of the piston, a pair of abutment-blocks similarly mounted on said last-mentioned abutment-arms, packing material similarly located with respect to said last-mentioned abutment-arms, three steam-admission ports communicating with the cylinder on the forward side of the respective abutments, three cylindrical valve-chests located in the respective steam-ports, three cylindrical valves mounted in the respective valve-chests, a valve-rod coaxial with the valve of said central piston-section and adapted to oscillate the same, a second valve-rod coaxial with the other two valves and adapted to oscillate the same, a pair of rock-arms mounted on the respective rock-shafts, a pair of eccentrics mounted on the main shaft of the engine and connected with the respective rock-arms whereby to give said abutments a motion corresponding to the motion of the respective piston-sections, a second pair of rock-arms mounted on the respective valve-rods, a second pair of eccentrics connected with said last-mentioned rock-arms to oscillate said valves, and three packing-segments oscillably mounted on the respective abutments and hermetically connected therewith and formed coradial with the respective piston-sections and adapted to press against the latter, substantially as described.

In witness whereof I have hereunto set my hand in the presence of two witnesses.

HORMISDAS DENIS.

Witnesses:
J. A. MARION,
T. MYNARD.